United States Patent Office 3,184,498
Patented May 18, 1965

3,184,498
PREPARATION OF ALKOXY-NAPHTHONITRILE
William A. Bolhofer, Frederick, Pa., assignor to Merck & Co., Inc., Rahway, N.J., a corporation of New Jersey
No Drawing. Filed May 10, 1962, Ser. No. 193,850
2 Claims. (Cl. 260—465)

This invention is concerned with a novel process for preparing alkoxy-naphthonitrile compounds from commercially available starting materials. The alkoxy-naphthonitriles obtained by the novel process of this invention are useful intermediates for the preparation of (α-alkylideneacyl)-naphthyloxyacetic acid compounds, diuretic agents described and claimed in my joint application, Serial No. 152,137, filed November 14, 1961.

While many alkoxy-naphthonitrile compounds, and, in particular, 5-methoxy-2-naphthonitrile, are known compounds, many of them are not commercially available and in order to use them as intermediates in the preparation of the (α-alkylideneacyl)-naphthyloxyacetic acid compounds of the above application, they must be prepared from products which are commercially available. One method described in the prior literature teaches that 5-methoxy-2-naphthonitriles and other related alkoxy-naphthonitriles can be made from commercially available β-aminonaphthalene [J. Jacques, Bull. Soc. Chim., France, page 857 (1953)]. This method, however, is undesirable for several reasons. In particular, as the commercially available β-aminonaphthalene used as a starting material in this process is known to be an active carcinogen, the use of this process, particularly on a commercial scale, should be avoided because of the hazards to which the manufacturing people would be exposed. Another important disadvantage involved in the use of the process described by Jacques from a preparative standpoint resides in the fact that the β-aminonaphthalene compound must be sulfonated to form the corresponding sulfonic acid derivative. During the sulfonation step, four position isomers of the sulfonic acid derivative are formed which then need to be separated before proceeding with the preparation of the particular alkoxy-naphthonitrile desired. Because of the need for separating the isomers and also because of the limited yield of each isomer resulting therefrom, commercial production by this process would be time-consuming and costly in addition to being hazardous on account of the toxic properties of the starting material.

As the process described by Jacques for the preparation of alkoxy-naphthonitriles is not desirable for commercial manufacturing purposes, applicant devised a novel method which avoids the formation of any position isomers and which employs a commercially available starting material, which, to the best of applicant's knowledge and belief, is relatively physiologically innocuous.

The process devised by applicant can be used commercially to prepare alkoxy-naphthonitriles or similar products having additional substituents attached to the naphthalene nucleus, patricularly one or more substituents selected from lower alkyl substituents attached to the naphthalene nucleus, and in particular it can be used to prepare 5-alkoxy-2-naphthonitriles which are either unsubstituted or additionally substituted as hereinbefore described.

The following reaction scheme illustrates the novel method of this invention.

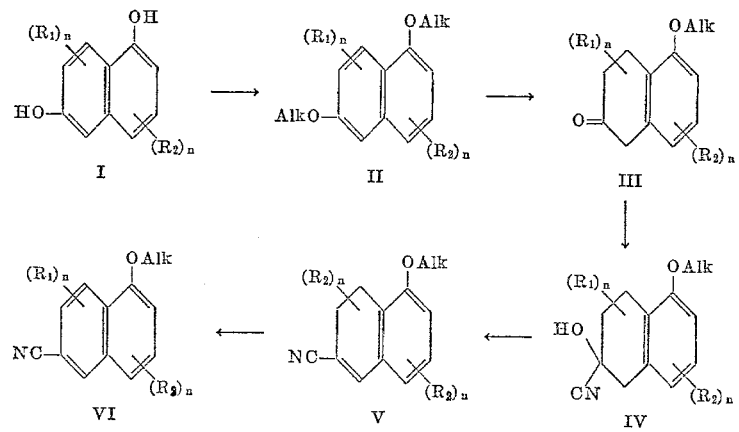

The preparation of 5-methoxy-2-tetralone (III) [also known as 3,4-dihydro-5-methoxy-2(1H)-naphthalenone] from 1,6-naphthalenediol (I) is described by J. W. Cornforth et al., J. Chem. Soc. 1855 (1949), especially at page 1861. While the preparation of this substance does not form part of the claimed invention, a discussion of it is incorporated to illustrate the preparation of the intermediate compound (III) from a commercially available starting material. The preparation of 5-alkoxy-2-tetralone (III) is accomplished by alkylation (for example with methylsulfate or other known alkylating agents) of 1,6-naphthalenediol and the 1,6-dialkoxynaphthalene compound (II) thus obtained then is reduced with sodium and alcohol followed by a proper workup with acid to yield compound III. In particular, the method can be carried out by adding an alkylsulfate to a mixture of 1,6-naphthalenediol in 2 N sodium hydroxide. Additional quantities of the alkylsulfate and sodium hydroxide can be added after the initial reaction has subsided in order to bring the reaction to completion and to increase the yield. The 1,6-dialkoxynaphthalene compound thus obtained then is dissolved in boiling ethyl alcohol and metallic sodium is added to the refluxing mixture. After all the sodium is dissolved, the alcohol is removed under reduced pressure, water and acid (for example strong mineral acid as hydrochloric acid) are added, and the product 5-alkoxy-2-tetralone (III) extracted and distilled. Other alkoxy-tetralones can be prepared by this method using the proper dihydroxynaphthalene starting materials.

Product III then is converted to product VI by the novel method of this invention by initially adding hydrogen cyanide to the tetralone compound (III). The reaction advantageously is carried out with cooling followed by slight warming at between about 20–25° C.

Dehydration of the tetralone cyanohydrin (IV) thus formed, advantageously with a nitrogenous base such as pyridine, picoline and the like, in the presence of a chlorinating agent, as phosphorus oxychloride, phosphorus trichloride or thionyl chloride and advantageously with cooling gives the dihydronaphthonitrile (V).

Aromatization of V by dehydrogenation with sulfur or selenium advantageously with heating at a temperature between about 175–250° C. gives the desired alkoxynaphthonitrile (VI). The dehydrogenation can, if desired, be catalyzed with a metal such as zinc powder or dust or other suitable metal catalyst.

The following examples describe the above novel process in more detail.

EXAMPLE 1

*Preparation of 5-methoxy-2-naphthonitrile*

STEP A.—PREPARATION OF 1,2,3,4-TETRAHYDRO-2-HYDROXY-5-METHOXY-2-NAPHTHONITRILE

Sodium cyanide (78 g., 1.59 moles) is added to a well-stirred mixture of 119.5 g. (0.637 mole) of 3,4-dihydro-5-methoxy-2(1H)-naphthalenone, 125 ml. of water and 75 ml. of ether at 0° C. Concentrated hydrochloric acid (137 ml.) is added to the mixture over a 65 min. period while holding the temperature below 10° C. with external cooling. Stirring is maintained for 2.5 hr. at 5° C. and then at 20–25° C. for 16 hr. The organic layer is separated and the water layer extracted with ether. The extract and organic layer are combined, extracted with water and concentrated under reduced pressure to yield an oil. Addition of hexane induces crystallization and 83 g. (64%) of 1,2,3,4-tetrahydro-2-hydroxy-5-methoxy-2-naphthonitrile is obtained, M.P. 90–98° C. Recrystallization from butyl chloride yields white crystals melting at 104–106° C.

*Analysis.*—Calculated for $C_{12}H_{13}NO_2$: C, 70.91; H, 6.45; N, 6.89. Found: C, 71.28; H, 6.53; N, 7.02.

STEP B.—PREPARATION OF 3,4-DIHYDRO-5-METHOXY-2-NAPHTHONITRILE

A well stirred solution of 51.5 g. (0.254 mole) of 1,2,3,4-tetrahydro-2-hydroxy-5-methoxy-2-naphthonitrile (M.P. 90–98° C.) in 200 ml. of pyridine is cooled to −3° C. and 77.7 g. (0.5 mole) of phosphorus oxychloride added over a 35 minute period. The mixture is stirred for 3 hr. at −3–0° C., 16 hr. at 20–25° C. and 1 hr. at 80–85° C. It then is poured into a mixture of 1 kg. of ice and 85 ml. of concentrated hydrochloric acid. The crystalline product is collected, washed with water and dried. Distillation at 140° C. and 0.2 mm. yields 46.2 g. of distillate (98% of theory) which melts at 40–45° C. Recrystallization from isopropyl alcohol raises the M.P. to 55–65° C.

*Analysis.*—Calculated for $C_{12}H_{11}NO$: C, 77.81; H, 5.99; N, 7.56. Found: C, 77.69; H, 5.86; N, 7.74.

STEP C.—PREPARATION OF 5-METHOXY-2-NAPHTHONITRILE

A mixture of 30.0 g. of 3,4-dihydro-5-methoxy-2-naphthonitrile (M.P. 40–45° C.) and 5.7 g. of sulfur is heated at 200–210° C. for 10 minutes, 1.0 g. of zinc dust is added and the mixture heated an additional 10 minutes. The hot melt is poured into 1.2 liters of boiling hexane and the solution filtered. On cooling, the filtrate yields 18.5 g. (62%) of 5-methoxy-2-naphthonitrile. Recrystallization from hexane gives product melting at 70–72° C. (reported by J. Jacques, supra, M.P. 76–77° C.).

EXAMPLE 2

*Preparation of 5-ethoxy-1-methyl-2-naphthonitrile*

1-methyl-2,5-naphthalenediol is alkylated with ethylsulfate to form 2,5-diethoxy-1-methylnaphthalene which then is reduced with metallic sodium in alcohol followed by treatment with acid by substantially the same methods described by Cornforth, supra, to give 3,4-dihydro-5-ethoxy-1-methyl-2(1H)-naphthalenone. This product then is converted by substantially the same procedures described in Example 1, Steps A through C to yield 5-ethoxy-1-methyl-2-naphthonitrile.

EXAMPLE 3

*Preparation of 5-methoxy-8-methyl-2-naphthonitrile*

8-methyl-2,5-naphthalenediol is alkylated with methylsulfate to form 2,5-dimethoxy-8-methylnaphthalene which then is reduced with metallic sodium in alcohol followed by treatment with acid by substantially the same methods described by Cornforth et al., supra, to give 3,4-dihydro-5-methoxy-8-methyl-2(1H)-naphthalenone. This product then is converted by substantially the same methods described in Example 1, Steps A through C, to yield 5-methoxy-8-methyl-2-naphthonitrile

EXAMPLE 4

*Preparation of 5-methoxy-1,8-dimethyl-2-naphthonitrile*

1,8-dimethyl-2,5-naphthalenediol is alkylated with methylsulfate to form 2,5-dimethoxy-1,8-dimethylnaphthalene which then is reduced with metallic sodium in alcohol followed by treatment with acid by substantially the same methods described by Cornforth et al., supra, to give 3,4-dihydro-5-methoxy-1,8-dimethyl-2(1H)-naphthalenone. This product then is converted by substantially the same methods described in Example 1, Steps A through C, to yield 5-methoxy-1,8-dimethyl-2-naphthonitrile.

EXAMPLE 5

*Preparation of 5-methoxy-1,6-dimethyl-2-naphthonitrile*

1,6-dimethyl-2,5-naphthalenediol is alkylated with methylsulfate to form 2,5-dimethoxy-1,6-dimethylnaphthalene which then is reduced with metallic sodium in alcohol followed by treatment with acid by substantially the same methods described by Cornforth et al., supra, to give 3,4-dihydro-5-methoxy-1,6-dimethyl-2(1H)-naphthalenone. This product then is converted by substantially the same procedures described in Example 1, Steps A through C, to yield 5-methoxy-1,6-dimethyl-2-naphthonitrile.

While the invention has been described by means of the above specific examples, it is to be understood that it is not limited to the specific starting materials employed therein or to the specific reactants and/or reaction conditions used, but is to be understood to include variations and modifications thereof falling within the scope of the generic discussion of the invention and within the scope of the appended claims.

What is claimed is:

1. In the method of preparing a lower alkoxy-naphthonitrile, the steps comprising:
    (a) admixing lower alkoxy-tetralone and hydrogen cyanide while initially cooling and then warming to 20–25° C.,
    (b) dehydrating the resulting lower alkoxy-tetralone cyanohydrin by the addition of a chlorinating agent selected from the group consisting of phosphorous oxychloride, phosphorous trichloride and thionyl chloride, in the presence of a solvent selected from the group consisting of pyridine and picoline, while cooling, and
    (c) aromatizing the resulting dihydronaphthonitrile by dehydrogenating with an agent selected from the group consisting of sulfur and selenium in the presence of zinc, while heating to a temperature of 175–250° C.

2. The method according to claim 1 in which the starting compound is 3,4-dihydro-5-methoxy-2-naphthalenone.

References Cited by the Examiner

UNITED STATES PATENTS 2,744,903    5/56    Boettner _____ 260—696

FOREIGN PATENTS 65,823    5/50    Netherlands.

OTHER REFERENCES

Cook et al.: Journal of Chemical Society, 1936, pp. 1431–1434.

CHARLES B. PARKER, *Primary Examiner.*